(12) United States Patent
Wyrwas (10) Patent No.: US 10,275,002 B2
(45) Date of Patent: Apr. 30, 2019

(54) ENCLOSURE FOR AN ELECTRONIC DEVICE

(71) Applicant: Prepared for Flight LLC, Severn, MD (US)

(72) Inventor: Edward Wyrwas, Severn, MD (US)

(73) Assignee: Prepared for Flight LLC, Severn, MD (US)

( * ) Notice: Subject to any disclaimer, the term of this patent is extended or adjusted under 35 U.S.C. 154(b) by 99 days.

(21) Appl. No.: 15/668,921

(22) Filed: Aug. 4, 2017

(65) Prior Publication Data

US 2018/0046234 A1 Feb. 15, 2018

Related U.S. Application Data

(60) Provisional application No. 62/374,245, filed on Aug. 12, 2016.

(51) Int. Cl.
| | |
|---|---|
| *F25B 21/02* | (2006.01) |
| *H05K 7/20* | (2006.01) |
| *G06F 1/20* | (2006.01) |
| *B01L 7/00* | (2006.01) |

(52) U.S. Cl.
CPC .............. *G06F 1/206* (2013.01); *F25B 21/02* (2013.01); *G06F 1/20* (2013.01); *G06F 2200/201* (2013.01)

(58) Field of Classification Search
USPC .................................................. 165/104.14
See application file for complete search history.

(56) References Cited

U.S. PATENT DOCUMENTS

| | | | | |
|---|---|---|---|---|
| 4,047,198 A | * | 9/1977 | Sekhon ................... | H01L 23/42 165/104.26 |
| 4,730,665 A | * | 3/1988 | Cutchaw ............... | H01L 23/433 165/185 |
| 5,349,499 A | * | 9/1994 | Yamada ................ | H01L 23/427 165/104.33 |
| 2011/0013258 A1 | * | 1/2011 | Lee ....................... | G02B 26/026 359/296 |
| 2011/0315343 A1 | * | 12/2011 | Campbell ........... | F28D 15/0233 165/80.3 |
| 2013/0043070 A1 | * | 2/2013 | Endt ........................ | H02G 3/22 174/663 |
| 2013/0091868 A1 | * | 4/2013 | Campbell ............... | F25B 21/02 62/3.2 |
| 2014/0031606 A1 | * | 1/2014 | Hansen ................. | A61M 1/127 600/16 |

* cited by examiner

*Primary Examiner* — Frantz F Jules
*Assistant Examiner* — Erik Mendoza-Wilkenfel
(74) *Attorney, Agent, or Firm* — The Webb Law Firm (57) ABSTRACT

A thermal transfer system includes an enclosure, optional thermal insulation inside the enclosure, a dielectric fluid inside the enclosure, and a porous medium inside the enclosure. The porous medium can be at least partially immersed in the dielectric fluid. A cooling device can have a first surface contacting an interior surface of the enclosure and a second surface contacting the dielectric fluid, the porous medium, or both. The porous medium can include a cutout or cavity configured to support an electrical or electronic device immersed in the dielectric fluid. A port can be in a wall of the enclosure and a set of electrical conductors can run through the port and the electrical or electronic device immersed in the dielectric fluid.

20 Claims, 12 Drawing Sheets

ENCLOSURE FOR AN ELECTRONIC DEVICE

CROSS REFERENCE TO RELATED APPLICATION

This application claims the benefit of U.S. Provisional Application No. 62/374,245, filed Aug. 12, 2016, entitled "Enclosure for an Electronic Device", the contents of which are incorporated herein in its entirety by reference.

BACKGROUND OF THE INVENTION

Field of the Invention

The invention relates generally to an enclosure for housing an electrical and/or electronic component/device, such as, for example, without limitation, a printed circuit board (PCB) upon which can be mounted electrical and/or electronic components, an assembly of PCBs configured to perform one or more functions, e.g., a computer, a power supply, etc. More particularly, the invention relates generally to an enclosure for immersion cooling of electrical and/or electronic device(s) using a dielectric fluid infused porous medium for both thermal transport and mechanical load dampening, without the need for a pump to exchange the dielectric fluid in the enclosure.

Description of Related Art

It is known in the art that thermal management has the greatest influence on electronics reliability. In this regard, some estimates are that as much as 70 percent of all electronic failures in the military are thermally related.

It is estimated that every 10° C. increase in temperature during continuous operation cuts electronics reliability in half. Moreover, this problem isn't confined to just components operating at higher temperature, but also thermal fatigue. Specifically, as electronic components go through heat cycles, their temperatures can vary widely if the cooling system is not well designed.

Integral to the electronics system design, especially where thermal management and electronics cooling are concerned, is the enclosure housing the components. Currently, a number of enclosure options using a variety of different cooling methods are available. One traditional approach is air cooling, with or without the use of fans.

With increasing power density of electrical and/or electronic components/devices being produced today and expected to be produced in the future, especially where these components/devices may be used in harsh environments, such as military and aerospace applications, there is a need for an improved enclosure that can keep such components/devices operating within acceptable operating temperature ranges while, simultaneously, providing mechanical robustness and resistance to sudden deceleration, e.g., when the enclosure is dropped or handled roughly.

SUMMARY OF THE INVENTION

Generally, provided is an immersion-based thermal transfer system for one or more electronic devices that provides mechanical robustness for the electronic device(s) within the system. More specifically, provided is an enclosure or portion thereof for immersion cooling of an electronic device using a dielectric infused porous medium for both thermal transport and mechanical load dampening. In an example, no pump system is required to move or exchange the dielectric fluid within the immersion system.

According to one preferred and non-limiting embodiment or aspect, provided is a thermal transfer system that includes: an enclosure; a dielectric fluid inside the enclosure; a porous medium inside the enclosure, said porous medium at least partially immersed in said dielectric fluid; a cooling device having a first surface contacting an interior surface of the enclosure and a second surface contacting the dielectric fluid, the porous medium, or both the dielectric fluid and the porous medium; a cutout or cavity in the porous medium, said cutout or cavity configured to support an electrical or electronic device immersed in the dielectric fluid; a port in a wall of the enclosure; and a set of electrical conductors between the port and the electrical or electronic device immersed in the dielectric fluid.

In one preferred and non-limiting embodiment or aspect, the system can further include thermal insulation between the porous medium and the enclosure.

In one preferred and non-limiting embodiment or aspect, the set of electrical conductors can include one or more conductors.

In one preferred and non-limiting embodiment or aspect, the port can be configured to receive a connector that includes the set of electrical conductors.

In one preferred and non-limiting embodiment or aspect, the port can be configured to form a fluid tight seal between the connector and the enclosure that avoids the dielectric fluid from exiting the enclosure between the connector and the enclosure.

In one preferred and non-limiting embodiment or aspect, the port can be configured to receive therethrough a cable that includes the set of electrical conductors. In an example, the cable can be round or flat.

In one preferred and non-limiting embodiment or aspect, the port can be configured to form a fluid tight seal between the cable and the enclosure that avoids the dielectric fluid from exiting the enclosure between the cable and the enclosure.

In one preferred and non-limiting embodiment or aspect, the enclosure can include an alignment feature, such as, for example, a recess, configured to mate with mating alignment feature of the cable or connector.

In one preferred and non-limiting embodiment or aspect, the porous medium can be a unitary piece or can be comprised of a plurality of porous sheets/layers.

In one preferred and non-limiting embodiment or aspect, the cutout or cavity can be defined by a subset of the plurality of porous sheets/layers.

In one preferred and non-limiting embodiment or aspect, the cooling device can be a thermoelectric cooler, a fluid radiator, a liquid chamber, or a vapor chamber.

In one preferred and non-limiting embodiment or aspect, the system can further include a heat spreader including one or more fins extending laterally from an exterior surface of the enclosure.

In one preferred and non-limiting embodiment or aspect, the system can include a fan positioned such that, when running, the fan moves air across the one or more fins.

In one preferred and non-limiting embodiment or aspect, the enclosure can be made from aluminum.

In one preferred and non-limiting embodiment or aspect, the thermal insulation can be silicone.

In one preferred and non-limiting embodiment or aspect, the dielectric medium can be oil.

In one preferred and non-limiting embodiment or aspect, the enclosure can be sealed such that the dielectric fluid remains inside the enclosure.

Further preferred and non-limiting embodiments or aspects are set forth in the following numbered clauses.

Clause 1: A thermal transfer system comprises: an enclosure; a dielectric fluid inside the enclosure; a porous medium inside the enclosure, said porous medium at least partially immersed in said dielectric fluid; a cooling device having a first surface contacting an interior surface of the enclosure and a second surface contacting the dielectric fluid, the porous medium, or both the dielectric fluid and the porous medium; a cutout or cavity in the porous medium, said cutout or cavity configured to support an electrical or electronic device immersed in the dielectric fluid; a port in a wall of the enclosure; and a set of electrical conductors between the port and the electrical or electronic device immersed in the dielectric fluid.

Clause 2: The system of clause 1 can further include thermal insulation between the porous medium and the enclosure.

Clause 3: The system of clause 1 or 2, wherein the set of electrical conductors can include one or more conductors.

Clause 4: The system of any one of clauses 1-3, wherein the port can be configured to receive a connector that includes the set of electrical conductors.

Clause 5: The system of any one of clauses 1-4, wherein the port can be configured to form a fluid tight seal between the connector and the enclosure that avoids the dielectric fluid from exiting the enclosure between the connector and the enclosure.

Clause 6: The system of any one of clauses 1-5, wherein the enclosure can include an alignment feature configured to mate with mating alignment feature of the connector.

Clause 7: The system of any one of clauses 1-6, wherein the port can be configured to receive therethrough a cable that includes the set of electrical conductors. In an example, the cable can be round or flat.

Clause 8: The system of any one of clauses 1-7, wherein the port can be configured to form a fluid tight seal between the cable and the enclosure that avoids the dielectric fluid from exiting the enclosure between the cable and the enclosure.

Clause 9: The system of any one of clauses 1-8, wherein the enclosure can include an alignment feature configured to mate with mating alignment feature of the cable.

Clause 10: The system of any one of clauses 1-9, wherein the porous medium can be comprised of a plurality of porous sheets/layers.

Clause 11: The system of any one of clauses 1-10, wherein the cutout or cavity can be defined by a subset of the plurality of porous sheets/layers.

Clause 12: The system of any one of clauses 1-11, wherein the cooling device can be a thermoelectric cooler.

Clause 13: The system of any one of clauses 1-12, wherein the cooling device can be a fluid radiator.

Clause 14: The system of any one of clauses 1-13, wherein the cooling device can be a liquid chamber or a vapor chamber.

Clause 15: The system of any one of clauses 1-14, wherein the system can further include a heat spreader that can include one or more fins extending laterally from an exterior surface of the enclosure.

Clause 16: The system of any one of clauses 1-15, wherein the system can further include a fan positioned such that, when running, the fan moves air across the heat spreader.

Clause 17: The system of any one of clauses 1-16, wherein the enclosure can be made from aluminum.

Clause 18: The system of any one of clauses 1-17, wherein the thermal insulation can be silicone.

Clause 19: The system of any one of clauses 1-18, wherein the dielectric medium can be oil.

Clause 20: The system of any one of clauses 1-19, wherein the enclosure can be sealed such that the dielectric fluid remains inside the enclosure.

DESCRIPTION OF THE INVENTION

Various non-limiting examples will now be described with reference to the accompanying figures where like reference numbers correspond to like or functionally equivalent elements.

For purposes of the description hereinafter, terms such as "end," "upper," "lower," "right," "left," "vertical," "horizontal," "top," "bottom," "lateral," "longitudinal," and derivatives thereof shall relate to the example(s) as oriented in the drawing figures. However, it is to be understood that the example(s) may assume various alternative variations and step sequences, except where expressly specified to the contrary. It is also to be understood that the specific example(s) illustrated in the attached drawings, and described in the following specification, are simply exemplary examples or aspects of the invention. Hence, the specific examples or aspects disclosed herein are not to be construed as limiting.

With reference to FIGS. 1-3B, an example enclosure 2 includes a main body 4 including walls 6a-6d, a top lid 8, and a bottom lid 10. Enclosure 2 in the shape of a box and including walls 6a-6d, top lid 8, and bottom lid 10 is not to be construed in a limiting sense since it is envisioned that enclosure 2 can have any shape deemed suitable and/or desirable by one of ordinary skill in the art.

Figure 2:
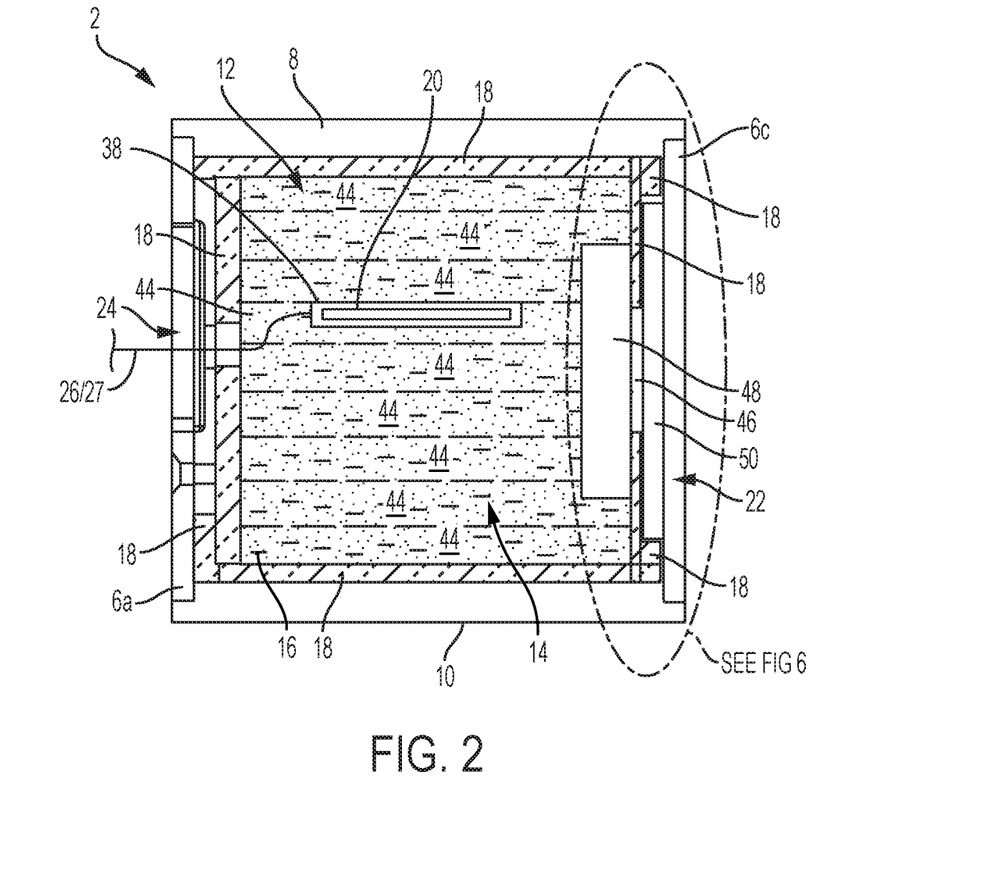
FIG. 2 shows a side view of the example enclosure of FIG. 1 further including internal thermal insulation, a porous medium, dielectric fluid, and an electrical or electronic device.

As shown best in FIG. 2, an interior 12 of enclosure 2 can include a semi-rigid porous medium 14 and a dielectric fluid 16. In an example, the internal volume of enclosure 2 can include or be filled, or substantially filled, with porous medium 14 and the internal volume of enclosure 2 can include or be filled, or substantially filled, with dielectric fluid 16, whereupon porous medium 14 can be fully or partially immersed in dielectric fluid 16. As used immediately above, "substantially filled" can mean that ≥90% of the internal volume of enclosure 2 is filled.

Internally, enclosure 2 can house a cooling device 22. In an example, cooling device 22 can be mounted to any interior surface of enclosure 2. In an example, cooling device 22 can be mounted to a wall 6, e.g., wall 6c, or lid 8 or 10 of enclosure 2. Example cooling devices 22 will be described hereinafter.

A thermal insulation 18 can line all or part of the interior side of each wall 6, top lid 8, and bottom lid 10. In the example shown in FIGS. 1-3B, thermal insulation 18 can line ≥90% of each of walls 6a, 6b, and 6d, top lid 8, and bottom lid 10. However, this is not to be construed in a limiting sense.

As shown best in FIG. 2, an electrical and/or electronic device 20 can be positioned in the bulk of porous medium 14. Electrical and/or electronic device 20 can also be surrounded by or immersed in dielectric fluid 16. In an example, dielectric fluid 16 may not completely fill the interior enclosure 2, e.g., to provide space for thermal expansion when heated by electrical and/or electronic device 20 from ambient temperature. Rather, dielectric fluid 16 can partially fill the interior enclosure 2 whereupon electrical and/or electronic device 20 can be surrounded by or immersed in dielectric fluid 16.

Example properties of porous medium 14 can include any one or more of the following: chemically stable; remains flexible over the expected temperature range to which it is to be exposed in use; resistant to ozone, oil, fat, grease, and solvents; hydrophobic; density: 1.35 to 1.0 g/cc; tensile strength: 3.4 MPa to 28.0 MPa; hardness: 20 to 100 Shore A; elongation: 100% to 800% (at breakage); thermal conductivity: 0.05 to 0.19 W/m-° K at 25° C.; maximum operating temperature: 90° C. to 125° C.; minimum operating temperature: −60° C. to −30° C.; and porosity: 15%-80%.

Example properties of dielectric fluid 16 can include any one or more of the following: low reactivity; specific gravity: 0.6 to 1.0; viscosity: 30 to 70 cSt at 40° C.; density: 800 $kg/m^3$ to 900 $kg/m^3$; thermal conductivity: 0.1 to 210 W/m-K at 25° C. (no maximum); boiling point: 260° C. to 400° C.; thermal expansion: 0.0003/° C. to 0.001/° C.; specific heat capacity: 1.5 to 2.2 kJ/kg° K; and dielectric constant: 1.7 to 3.0 at 25° C.

Example properties of enclosure 2 can include any one or more of the following: thermal conductivity: 50-210 W/m-° K (no maximum); modulus of elasticity: 50-110 GPa; and shear modulus: 20-50 GPa.

The organization of the elements shown in FIG. 2 promotes transfer of cooling to electrical and/or electronic device 20 within enclosure 2 while also promoting transfer of heat generated by electrical and/or electronic device 20 to the exterior of enclosure 2. Porous medium 14, dielectric fluid 16, and, if provided, thermal insulation 18 and their physical organization within enclosure 2 also provide mechanical support and cushioning for electrical and/or electronic device 20 within enclosure 2. It is envisioned that other elements (not shown) can also be added to enclosure 2 to provide fire proofing and tamper proofing for the electrical and/or electronic device 20 within enclosure 2.

Figure 3A:
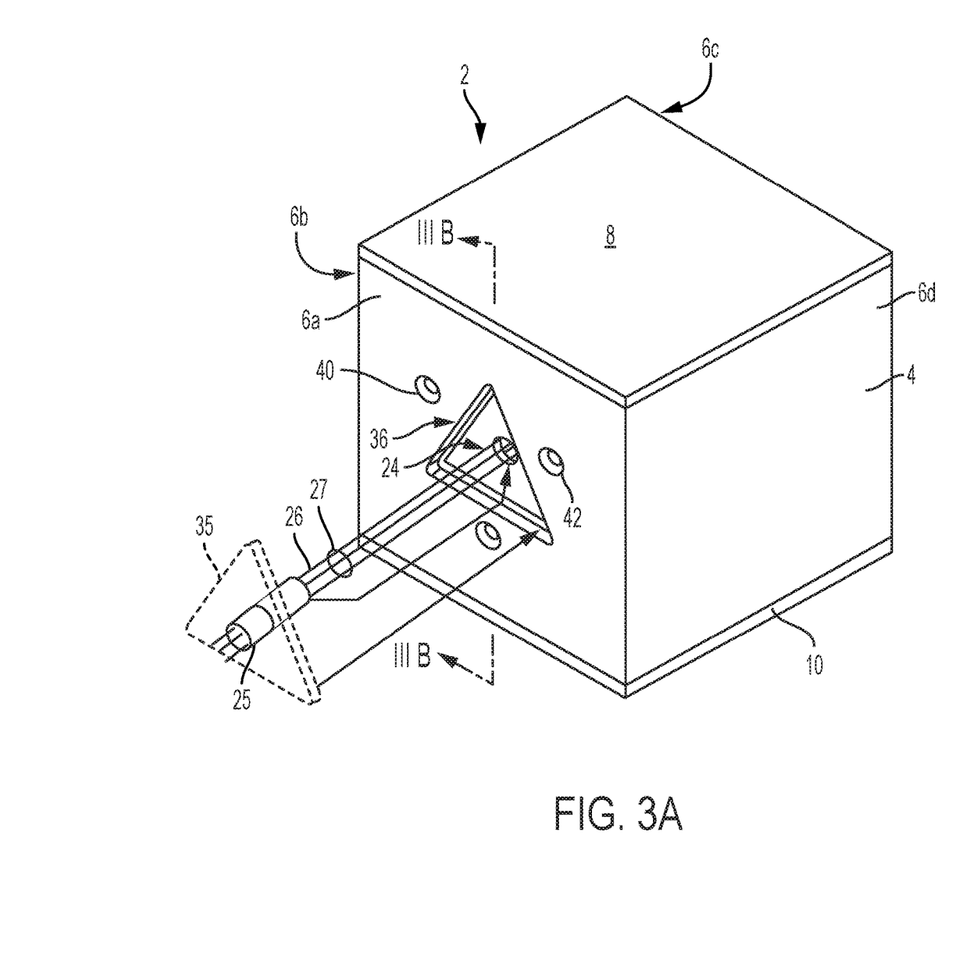
FIG. 3A is a perspective view of the exterior of the entire example enclosure of FIG. 1.

Electrical connection can be made to electrical and/or electronic device 20 within enclosure 2 via any suitable and/or desirable means now known or hereinafter developed, such as, without limitation, induction, proximity EMF/RF, or via an insulated pin or connector system on enclosure 2 which penetrates one of the walls of enclosure 2. In an example shown in FIGS. 2-3B, wall 6a of enclosure 2 can include a port 24 that can receive the first part 25 of a two part connector that can be mounted to wall 6a and which can be electrically connected to electrical and/or electronic device 20 via one or more conductors 26. Conductors 26 may be part of a cable 27. However, this is not to be construed in a limiting sense.

Where the first part 25 of the two part connector is mounted to wall 6a, a second, mating part (not shown) of the two part connector can be coupled to the first part that is received in port 24 in a manner known in the art. In an example, the first part 25 of the two part connector can create a fluid tight seal with wall 6a that can avoid the leakage of dielectric fluid 16 from the interior of enclosure 2. Since such two part connectors are well known in the art, further details regarding a two part connector will not be described further herein.

Figure 3B:
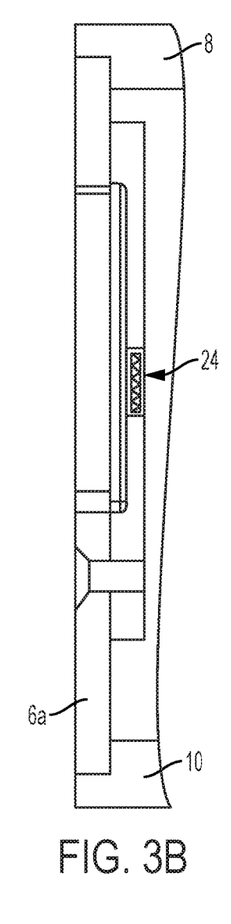
FIG. 3B is a view taken along lines IIIB-IIIB in FIGS. 1 and 3A.
Figure 4A:
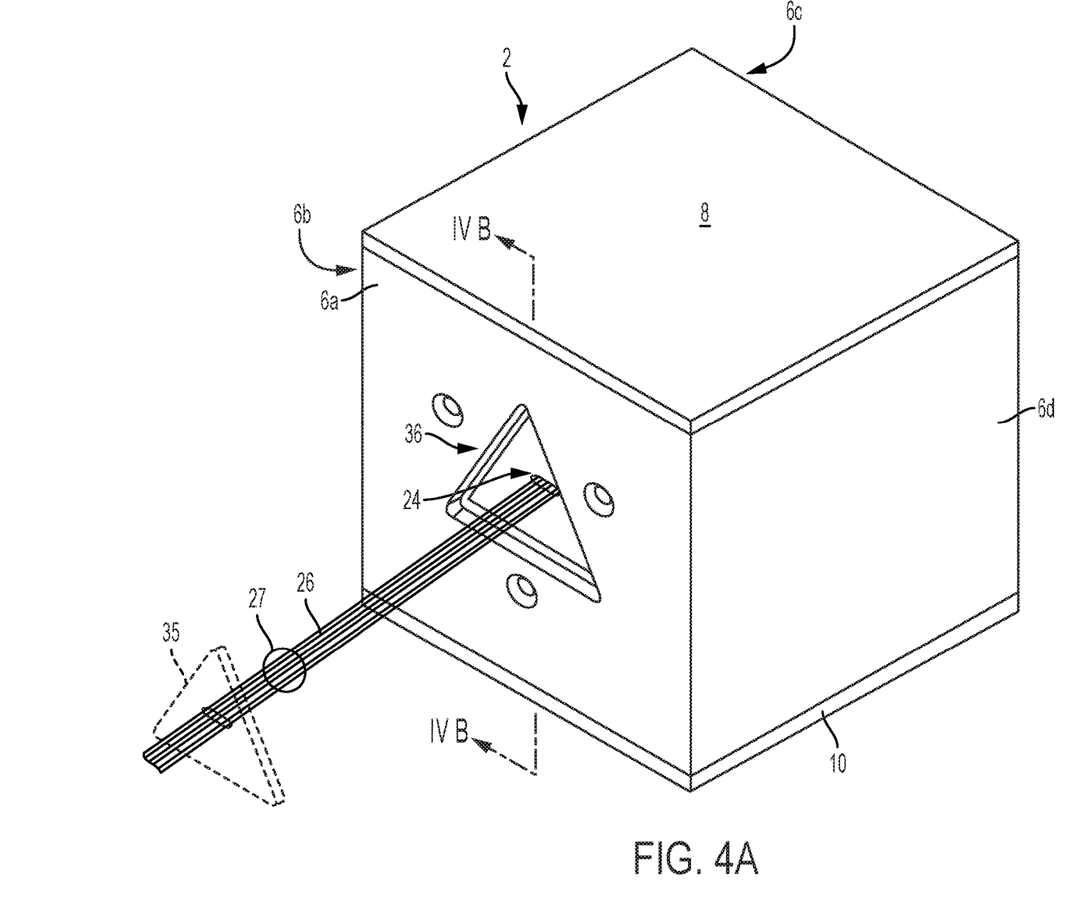
FIG. 4A is a perspective view of an example enclosure including an electrical interface comprising a slit-shaped port that can receive a complimentary shaped cable or cable bundle, such as, for example, without limitation, a polyimide substrate or a ribbon cable.
Figure 4B:
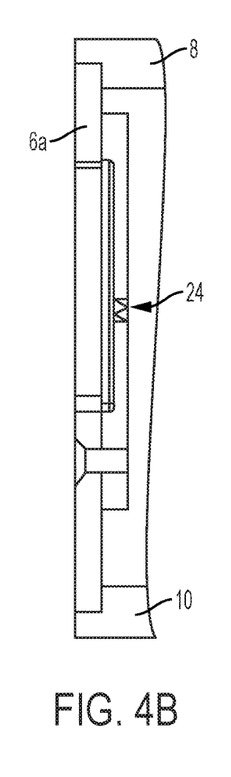
FIG. 4B is a section taken along lines IVB-IVB in FIG. 4A.
Figures 5A, 5B, 5C, 5D:
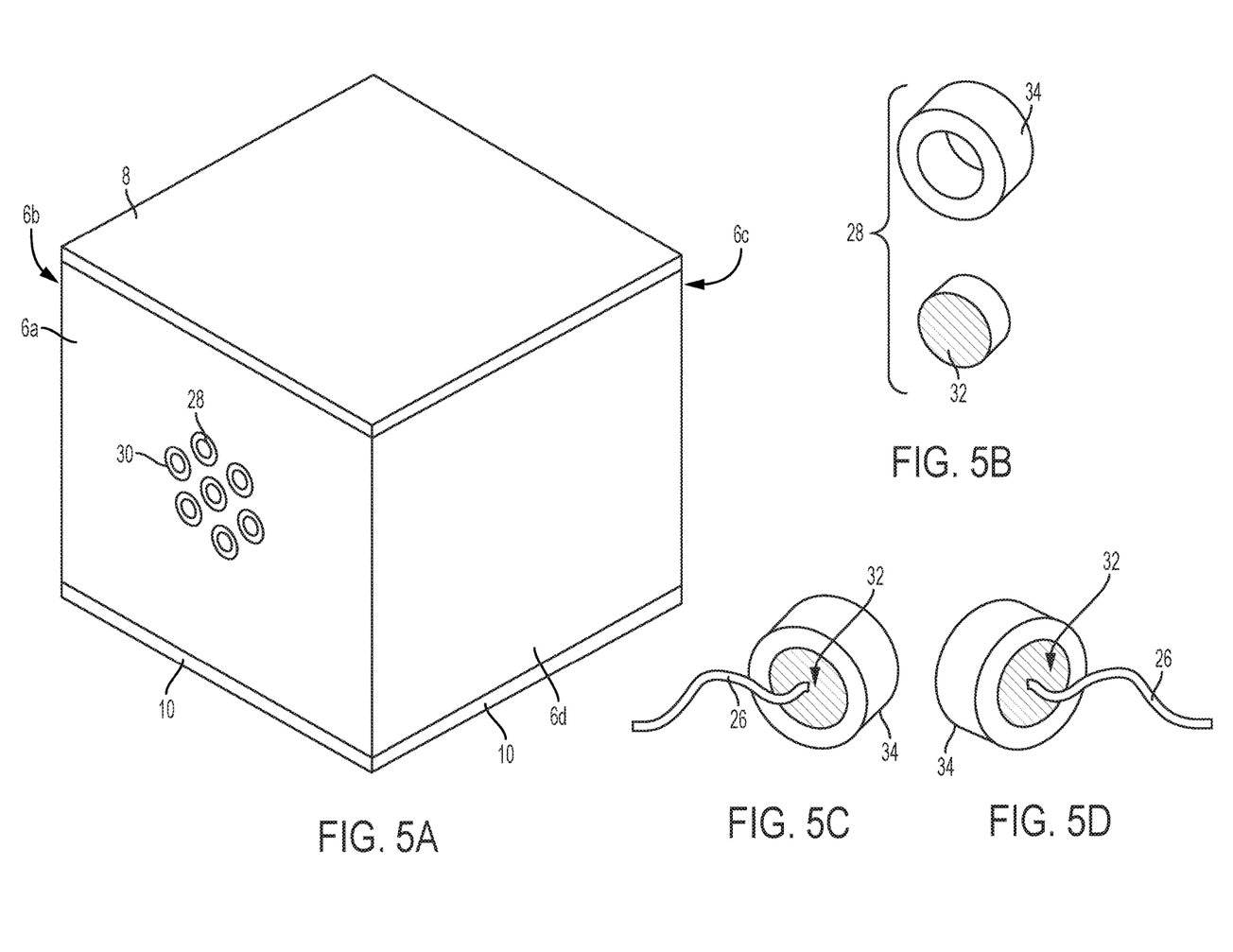
FIG. 5A is a perspective view of an example enclosure including a connector which, in an example, comprises one or more in-wall contacts.
FIG. 5B is an isolated exploded view of a single in-wall contact of FIG. 5A including a conductor slug and dielectric insulator ring.
FIG. 5C is a perspective view of the assembled in-wall contact of FIG. 5B showing a side of the in-wall contact that faces outward from the enclosure when included in the enclosure of FIG. 5A and including a conductor coupled to the conductor slug.
FIG. 5D is a perspective view of the assembled in-wall contact of FIG. 5B showing the side of the in-wall contact that faces inward into the enclosure when included in the enclosure of FIG. 5A and including a conductor coupled to the conductor slug.

In an example, port 24 can have a round shape, shown in FIGS. 2-3B, that can be configured to receive a complimentary shaped first part 25 of the two part connector, or a slit or slot shape, shown in FIGS. 4A-4B, that can be configured to receive the one or more conductors 26 or cable 27, for example, in the form of a planar polyimide substrate or a ribbon cable. However, these shapes are not to be construed in a limiting sense since port 24, the first part 25 of the two part connector or the one or more conductors 26 or cable 27 that can be received in port 24 can have any shape deemed suitable and/or desirable by one of ordinary skill in the art. In an example, port 24 can be configured to receive conductors 26 or cable 27 directly without the use of a connector.

In an example, as shown in FIG. 2, conductors 26 can be part of cable 27 which can extend between the exterior and the interior of enclosure 2 via port 24 and, if provided, the first part 25 of the two part connector in port 24. In an example, port 24 and/or cable 27, the latter comprising the one or more conductors 26, can be configured to create at the interface thereof a fluid tight seal that can avoid the leakage of dielectric fluid 16 from the interior of enclosure 2. In an example, cable 27 can be a polyimide substrate or a ribbon cable.

In another example shown in FIGS. 5A-5D, port 24 can be omitted and enclosure 2 can include one or more in-wall contacts 28 disposed in one or more holes 30 in a wall 6 of enclosure 2 in lieu of port 24. In an example, each in-wall contact 28 can include a conductive core 32 surrounded by an insulating ring 34 that electrically insulates conductive core 32 from the wall 6 of enclosure 2. In an example, an in-wall contact 28 can exclude the insulating ring 34 where the conductive core 32 is installed in all or part of a wall 6 that is made from an electrically insulating material. In this example, the conductive core 32 can be in direct contact with the wall 6 made from an electrically insulating material.

In an example, a side of a single conductive core 32 facing the exterior of enclosure 2 (FIG. 5C) can be coupled to a first part of a conductor 26 while the other side of said conductive core 32 facing the interior of enclosure 2 (FIG. 5D) can be coupled to a second part of the conductor 26 which, in-turn, can be coupled at its other end to electrical and/or electronic device 20.

In an example, the walls 6, top lid 8, and bottom lid 10 of enclosure 2 can be mechanically fastened, adhered, welded or otherwise closed. Moreover, while port 24 and in-wall contacts 28 are shown in wall 6a, this is not to be construed in a limiting sense since one or more ports 24 and/or one or more in-wall contacts 28 can be disposed in any one of the walls 6, top lid 8, and bottom lid 10. Moreover, multiple ports 24 and/or multiple in-wall contacts 28 can be disposed in any two or more of the walls 6, top lid 8, and bottom lid 10.

Figure 1:
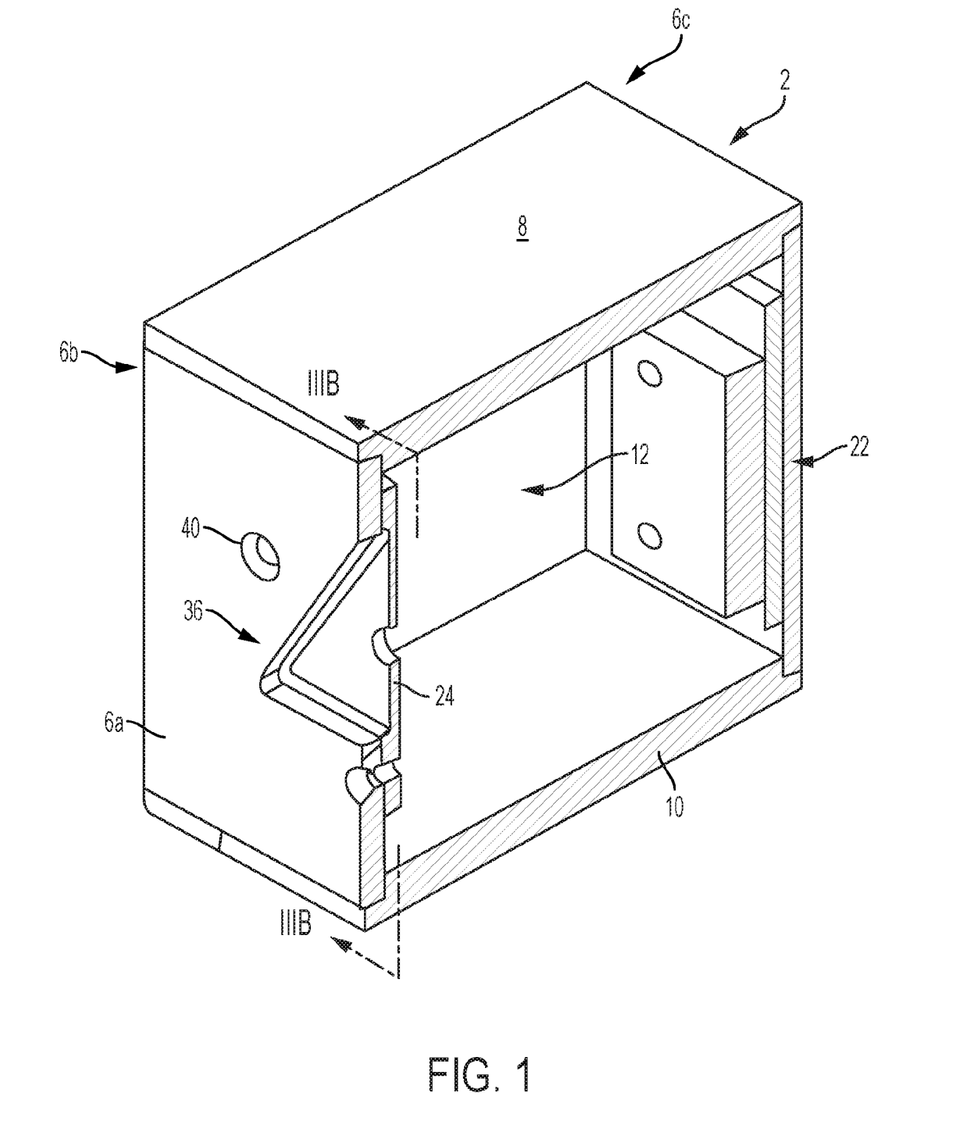
FIG. 1 shows a cross sectional perspective view of an example enclosure including an internal cooling device, in an example a thermoelectric cooler, and an electrical interface comprising a circular port that can receive a first part of a two part connector, or a cable, or a cable bundle.

Around each port 24 of the example enclosures 2 shown in FIGS. 1, 3A and 4A, the wall can include an alignment feature, such as, for example, a recess 36 configured to mate with a complimentary shaped alignment feature or structure 35 that can be coupled to or part of the conductor(s) 26, the cable 27, or the first part 25 of the two part connector to facilitate accurate alignment and insertion of the conductor(s) 26 or the cable 27 into port 24, the coupling of the second part of the two part connector to the first part 25 of the two part connector, to facilitate removal of the conductor(s) 26 or the cable 27 from port 24, and/or the uncoupling of the first part 25 and the second part of the two part connector.

In an example, cooling device 22 can be a thermoelectric cooler, porous medium 14 can be polychloroprene rubber, such as, for example, neoprene, dielectric fluid 16 can be a mineral oil, the walls and lids of enclosure 2 can be made from aluminum, and thermal insulation 18 can be RTV silicone. However, this is not to be construed in a limiting sense since it is envisioned that any device or material deemed suitable and/or desirable by one skilled in the art can be used for cooling device 22, porous medium 14, dielectric fluid 16, enclosure 2, and/or thermal insulation 18. For example, porous medium 14 can be formed from other synthetic rubbers, open-pore foams, polymers, or soft organic materials.

In an example, cooling device 22 can be rated to provide adequate cooling to decrease the temperature inside of enclosure 2, e.g., dielectric fluid 16, during operation of electrical and/or electronic device 20 to a suitable and/or desirable operating temperature or temperature range which compensates for the thermal dissipation of electrical and/or electronic device 20 in ambient temperature environments where enclosure 2, including porous medium 14, dielectric fluid 16, and electrical and/or electronic device 20, may be used.

Porous medium 14 can be formed to create a cavity 38 for electrical and/or electronic device 20, and to fill, or substantially fill, interior 12 of enclosure 2 and "suspend" electrical and/or electronic device 20 within enclosure 2—for example, suspend electrical and/or electronic device 20 centrally within enclosure 2.

Porous medium 14 can be infused with dielectric fluid 16 in any suitable and/or desirable manner, such as, without limitation, via vacuum or autoclave processes. The infusion of porous medium 14 with dielectric fluid 16 can be performed outside of enclosure 2 or within enclosure 2. In an example of vacuum infusing porous medium 14 with dielectric fluid 16, a reservoir (not shown) of dielectric fluid 16 can be fluidly coupled to a fill hole 40 (FIG. 3A) in a wall or lid of enclosure 2 and a vacuum pump (not shown) can be coupled to a vacuum hole 42 (FIG. 3A) in a wall or lid of enclosure 2. In response to the operation of the vacuum pump, the interior of enclosure 2 experiences a vacuum which draws dielectric fluid 16 from the reservoir into the interior of enclosure 2, immersing porous medium 14 and, if provided, electrical and/or electronic device 20 disposed in cavity 38, in dielectric fluid 16.

Figure 6:
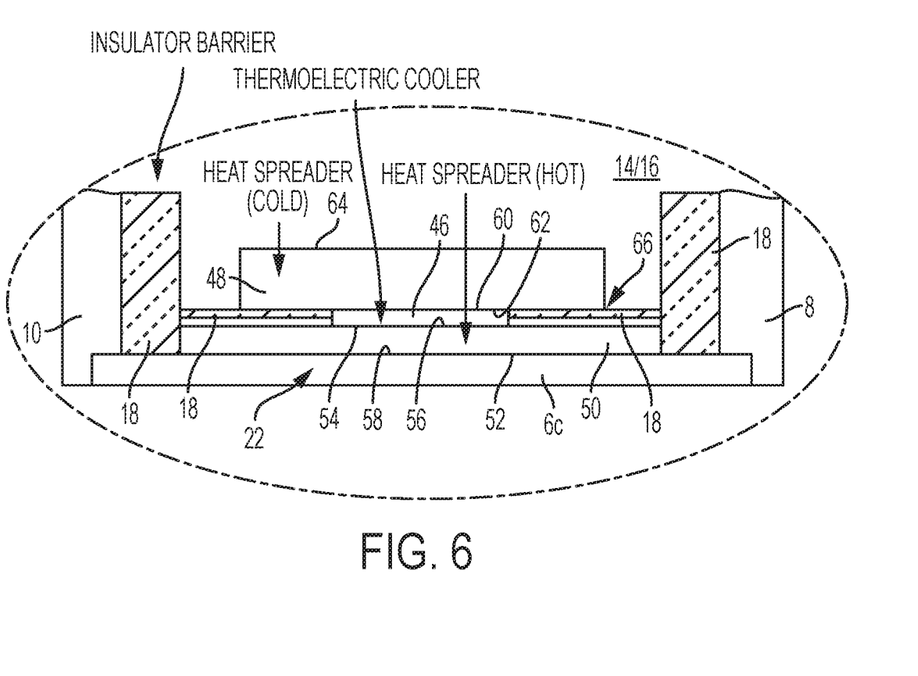
FIG. 6 is an isolated view of the circled portion of FIG. 2.

As shown in FIGS. 2 and 6, the inside walls of enclosure 2 and the end(s) of cooling device 22 can be lined with thermal insulation 18 in a manner that provides a thermal barrier between (1) porous medium 14 and the walls of enclosure 2 and (2) between porous medium 14 and the end(s) of cooling device 22. It is envisioned that the use of thermal insulation 18 can be optional where enclosure 2 is made from a material that can provide adequate thermal insulation between the interior and exterior of enclosure 2 for the anticipated use of enclosure 2 with a particular electrical and/or electronic device 20 in a particular ambient temperature environment. For example, if enclosure 2 designed for use in an artic environment, where cooling device 22 is provided for only occasional use during warmer ambient periods, thermal insulation 18 may be omitted.

As shown in FIG. 2, porous medium 14 can be formed from a plurality of porous sheets/layers 44 (shown separated by horizontal dashed lines) configured such that when assembled to form porous medium 14 includes cavity 38 for receiving electrical and/or electronic device 20. Conductor(s)/cable(s) 26/27 can be routed between electrical and/or electronic device 20 and each port 24 or each in-wall contacts 22 through the porous sheets/layers 44 or between adjacent pairs of porous sheets/layers 44.

In another example, porous medium 14 can be a unitary piece with cavity 38 formed therein via a slot (not shown) made between an exterior of porous medium 14 and cavity 38. In this example, electrical and/or electronic device 20 can be inserted into cavity 38 via this slot.

With reference to FIG. 6, in an example, cooling device 22 can be a thermoelectric (TE) cooler 46 that can be coupled to a source of electrical power (not shown) in any suitable and/or desirable manner, such as, for example, via conductor(s) 26. TE cooler 46 can include a cold heat spreader 48 on a side of TE cooler 44 that faces porous medium 14 and dielectric fluid 16 and a hot heat spreader 50 on a side of TE cooler 44 that faces and is in contact with a wall (or lid) of enclosure 2. In an example of assembled enclosure 2 including cooling device 22, a first surface 52 of hot heat spreader 50 can contact an interior 58 of a wall 6 (or lid) of enclosure 2; a first surface 54 of TE cooler 46 can contact a second surface 56 of hot heat spreader 50; a second surface 60 of TE cooler 46 can contact a first surface 60 of cold heat spreader 48; and a second surface 64 of cold heat spreader 48 can contact porous medium 14 and/or dielectric fluid 16.

In an example, a portion of thermal insulation 18 can extend laterally from the side(s) of TE cooler 46, in a gap 66 formed by TE cooler 46 positioned between cold heat spreader 48 and hot heat spreader 50, to the portions of thermal insulation 18 disposed on proximate walls or lids. In the example shown in FIG. 6, the portion of thermal insulation 18 in gap 66 extends laterally from the side(s) of TE cooler 46 and contacts the portions of thermal insulation 18 disposed on lids 8 and 10. However, this is not to be construed in a limiting sense.

Figure 7A:
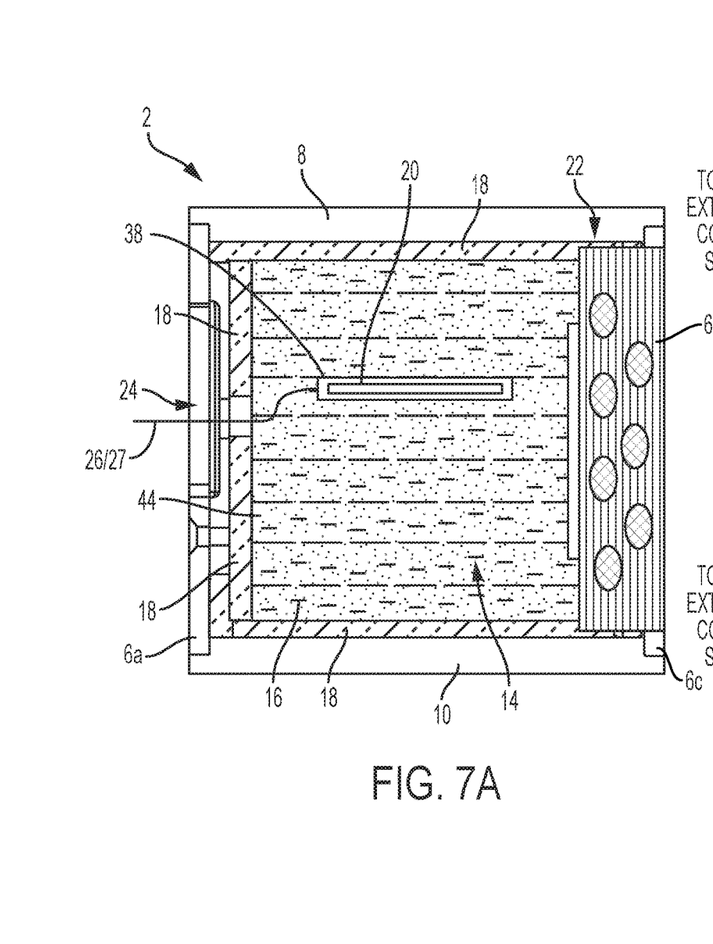
FIG. 7A is a cross section of an example enclosure including an internal cooling device in the nature of a fluid heat exchanger or radiator.
Figure 7B:
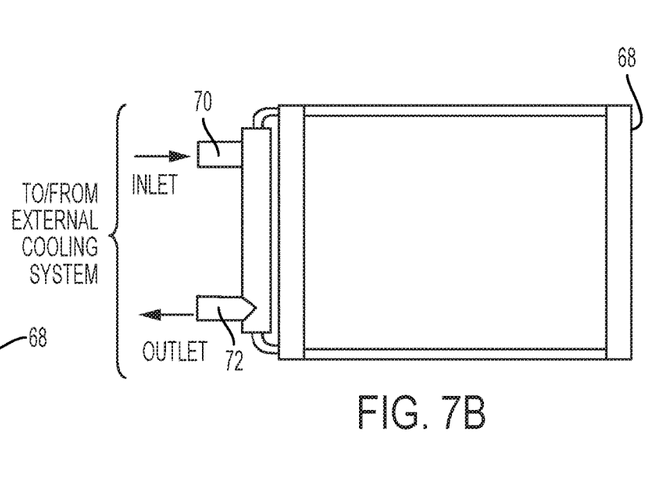
FIGS. 7B-7C are isolated side and top views of the fluid heat exchanger of FIG. 7A.
Figure 7C:
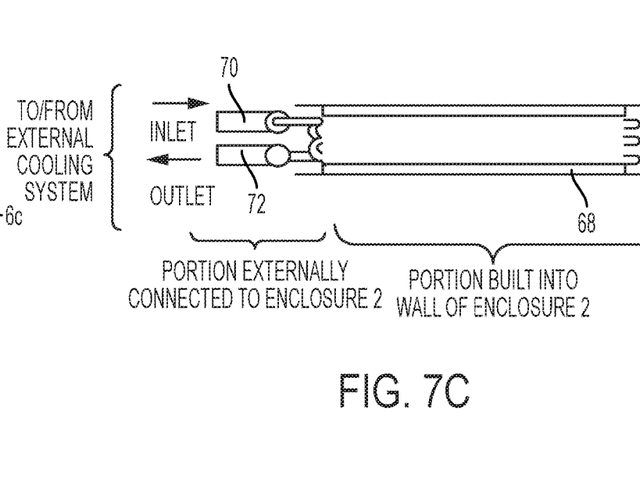

With reference to FIGS. 7A-7C, in another example, cooling device 22 can be an integrated heat exchanger 68, e.g., a fluid radiator, that can have an inlet 70 and an outlet 72 that can be coupled to an external cooling system, such as, for example, a pump, plumbing, and reservoir, (not shown)—whereupon water or any other suitable and/or desirable cooling fluid can be run through heat exchanger 68.

Figure 8A:
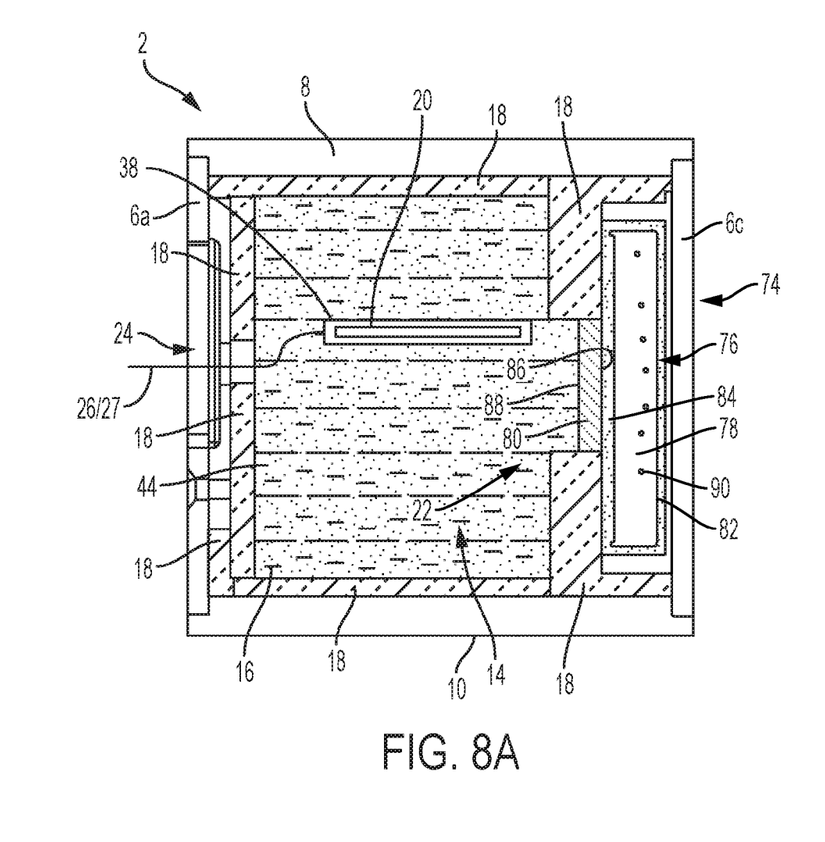
FIG. 8A is a cross section of an example enclosure including an internal cooling device in the nature of an evaporative heat exchanger, particularly, a vapor chamber.
Figure 8B:
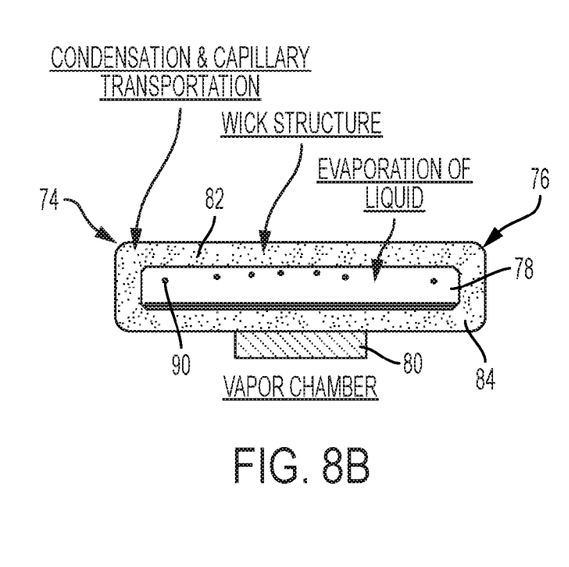
FIG. 8B is an isolated view of the cross section of the evaporative heat exchanger of FIG. 8A.

With reference to FIGS. 8A-8B, in another example, cooling device 22 can be a two-phase evaporation cooling chamber 74 that has an evaporation chamber body 76 defining a sealed chamber 78 that houses a vapor 90 and a heat absorber 80 on an exterior of evaporation chamber body 76. One side 82 of evaporation chamber body 76 can be in contact with an inner surface of chamber 2 while another, opposite side 84 of evaporation chamber body 76 can be in contact with one side 86 of heat absorber 80 and the other side 88 of heat absorber 80 can be in contact with porous medium 14 and/or dielectric fluid 16.

In an example of the use of two-phase evaporation cooling chamber 74, heat absorbed by heat absorber 80 from porous medium 14 and/or dielectric fluid 16 heats evaporation chamber body 76 causing vapor 90 proximate to or in contact therewith to absorb heat and to transfer said absorbed heat to other parts of evaporation chamber body 76, such as, for example, side 82 of evaporation chamber body 76 which absorb(s) heat from the heated vapor 90. The wall (or lid) of enclosure 2 in contact with side 82 transfers heat from side 82 to an exterior of said wall (or lid) of enclosure 2. This process of heat transfer from dielectric fluid 16 to the exterior of enclosure 2 can continue in response to the temperature of dielectric fluid 16 being greater than the ambient temperature outside of enclosure 2.

Figure 9A:
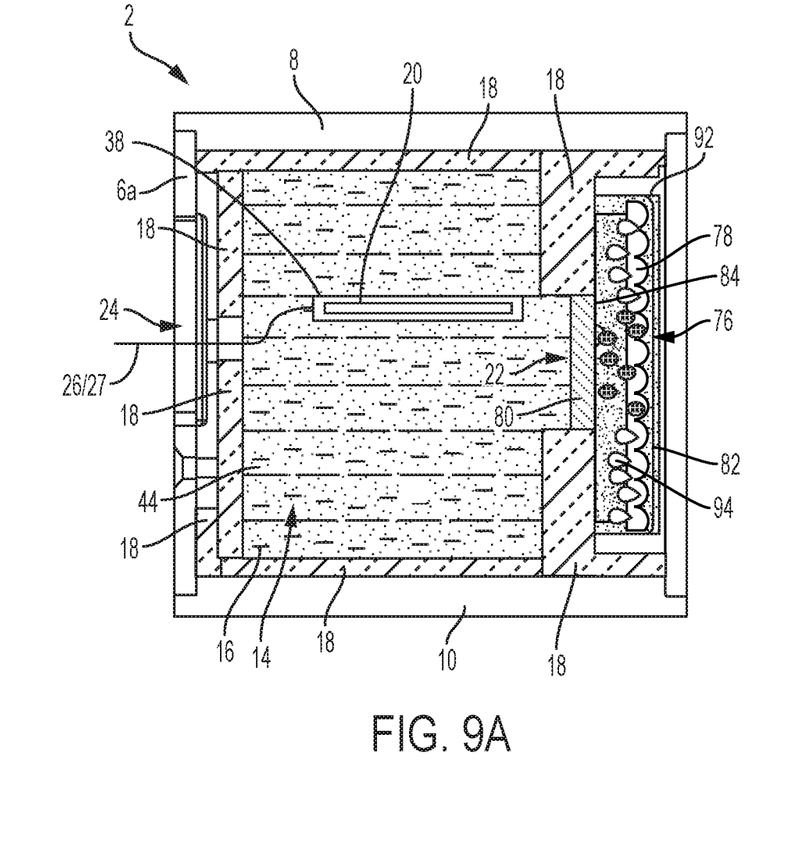
FIG. 9A is a cross section of another example enclosure including an internal cooling device in the nature of an evaporative heat exchanger, particularly, a liquid chamber.
Figure 9B:
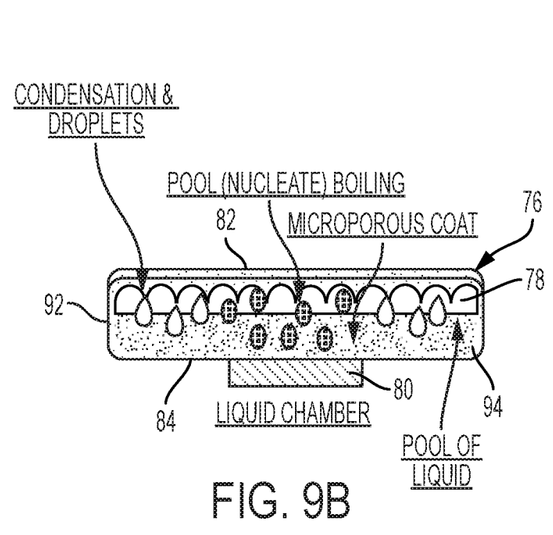
FIG. 9B is an isolated view of the cross section of the evaporative heat exchanger of FIG. 9A.

With reference to FIGS. 9A-9B, another example two-phase evaporation cooling chamber 92 is similar in most respects to the example two-phase evaporation cooling chamber 74 shown in FIGS. 8A-8B with the following exception. Instead of housing vapor 90, two-phase evaporation cooling chamber 92 houses a liquid 94.

In an example of the use of two-phase evaporation cooling chamber 92, heat absorbed by heat absorber 80 heats evaporation chamber body 76 causing liquid 94 proximate to or in contact with side 84 to absorb heat and vaporize and move in a direction away from heat absorber 80 into contact with side 82 of evaporation chamber body 76 which absorbs heat from vaporized liquid 94. The wall (or lid) of enclosure 2 in contact with side 82 transfers heat from side 82 to an exterior of said wall (or lid) of enclosure 2.

In an example, upon side 82 absorbing heat from vaporized liquid 94, vaporized liquid 94 can condense back to a liquid 94 which can return to a position proximate to or in contact with side 84 where it can, once again, vaporize. This process of heat transfer from dielectric fluid 16 to the exterior of enclosure 2 can continue in response to the temperature of dielectric fluid 16 being greater than the ambient temperature outside of enclosure 2.

Figure 10:
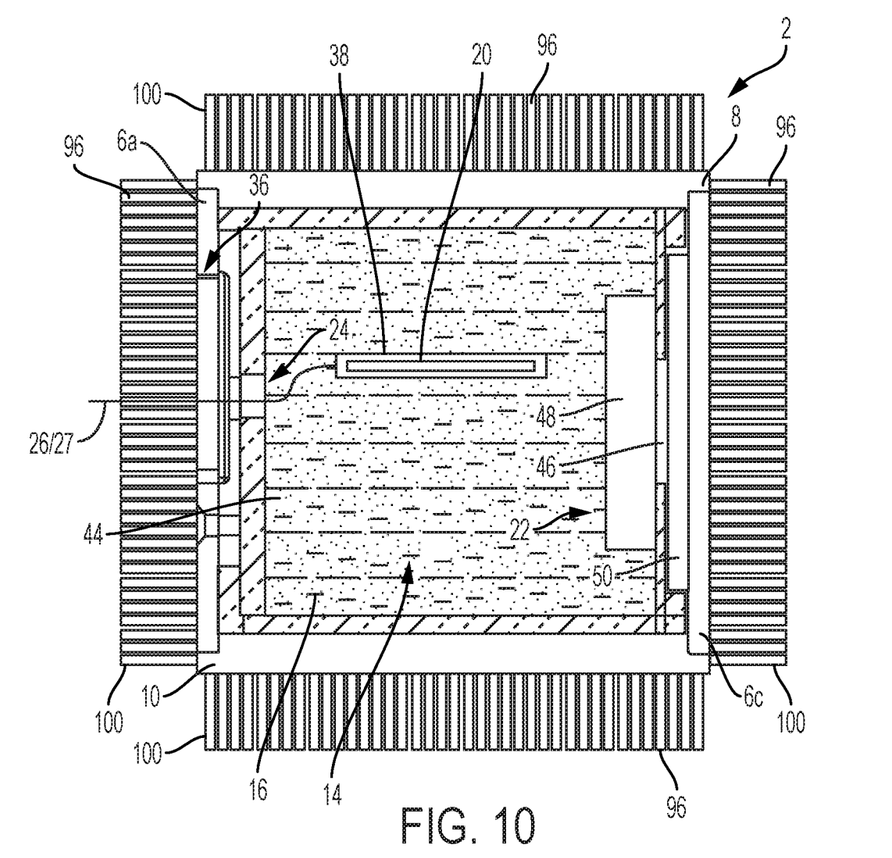
FIG. 10 is a cross section of an example enclosure including an example internal cooling device and a number of heat spreaders on exterior surfaces of the example enclosure.

With reference to FIG. 10, in another example further to the example shown in FIG. 2, the example enclosure 2 shown in FIG. 2 can include one or more external heat spreaders 96 coupled to one or more exterior surfaces of enclosure 2. In an example, each heat spreader 96 can include one or more fins 100 extending laterally from an exterior surface of the enclosure.

The illustration in FIG. 10 of heat spreaders 96 on walls 6a and 6c, and on lids 8 and 10 is not to be construed in a limiting sense since it is envisioned that one skilled in the art can use any suitable and/or desirable number of heat spreaders 96 on one or more of the exterior surfaces of enclosure 2. For example, a single heat spreader 96 can be provided on the exterior surface of a wall 6 (or lid) that includes cooling device 22 on the interior surface thereof. In another example, a single heat spreader 96 can be provided on the exterior surface of a first wall 6 (or lid) while cooling device 22 can be provided on the interior surface of a second, different wall 6 (or lid).

Figure 11A:
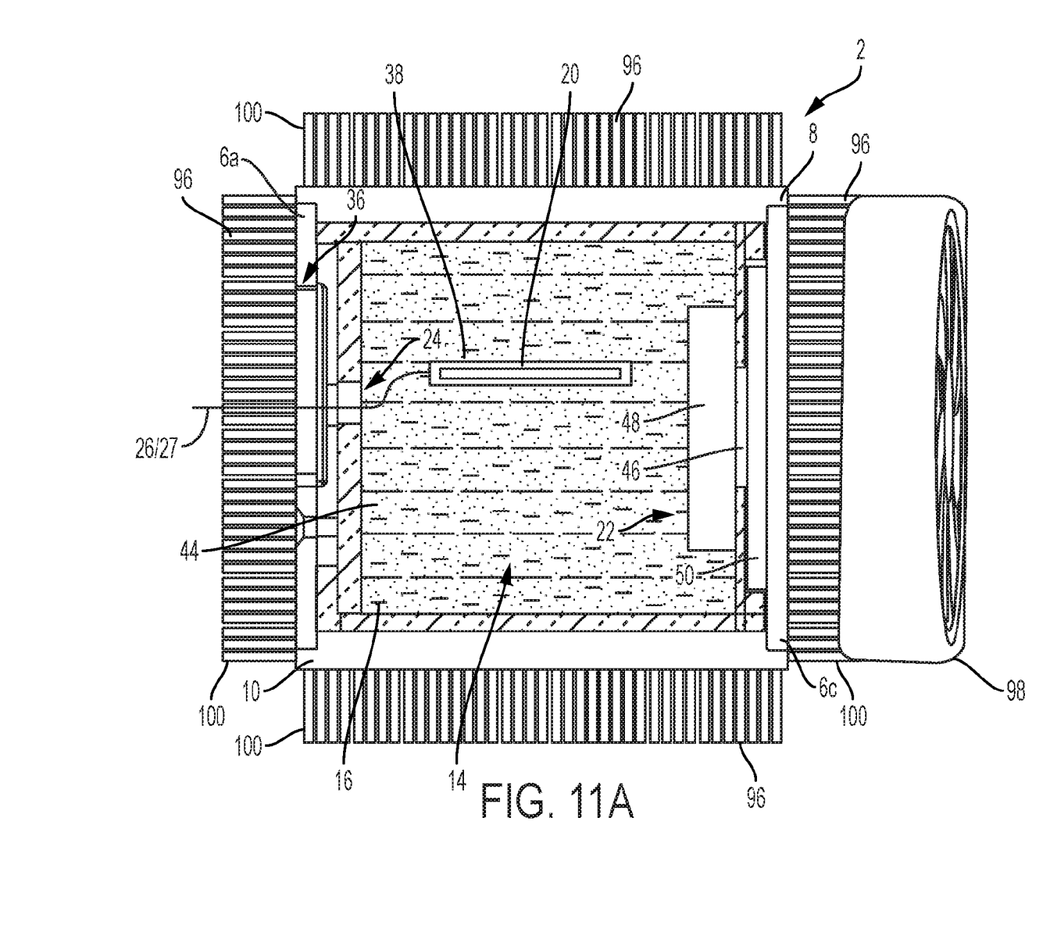
FIG. 11A is the cross section of the example enclosure of FIG. 10 including a fan on one of the heat spreaders.
Figure 11B:
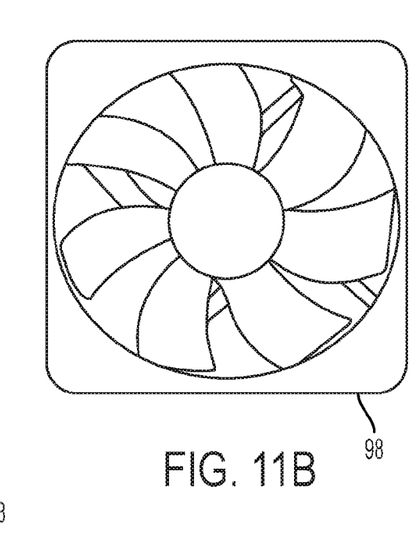
FIG. 11B is an isolated view of the fan of FIG. 11A.

With reference to FIGS. 11A-11B, in another example further to the example shown in FIG. 10, a fan 98 can be positioned on or proximate to a heat spreader 96. When supplied with electrical power, fan 98 can move ambient air across fins 100 of heat spreader 96, thereby aiding in the movement of heat from heat spreader 96 and, more practically, from electrical and/or electronic device 20, to the ambient environment.

Figure 12A:
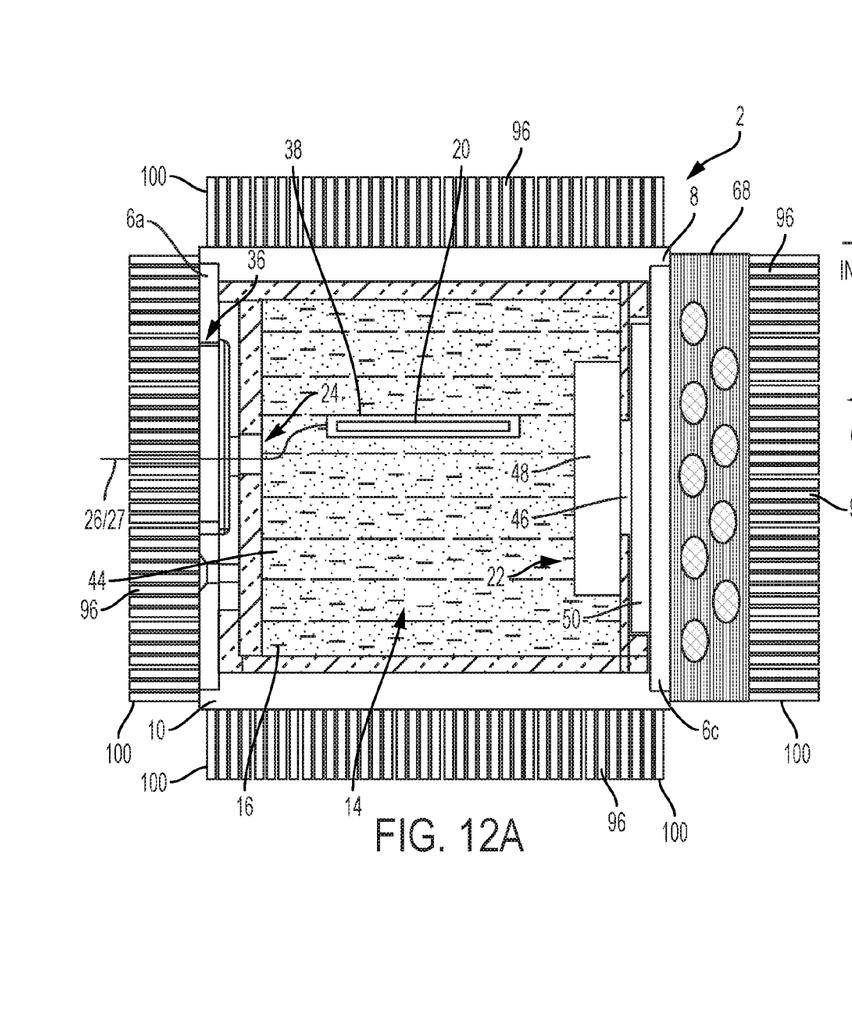
FIG. 12A is a cross section of the example enclosure of FIG. 10 including a fluid heat exchanger between one of the heat spreaders and the cooling device.
Figure 12B:
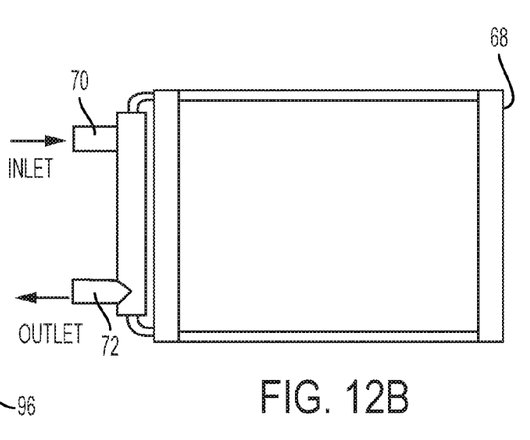
FIGS. 12B-12C are isolated side and top views of the fluid heat exchanger of FIG. 12A.
Figure 12C:
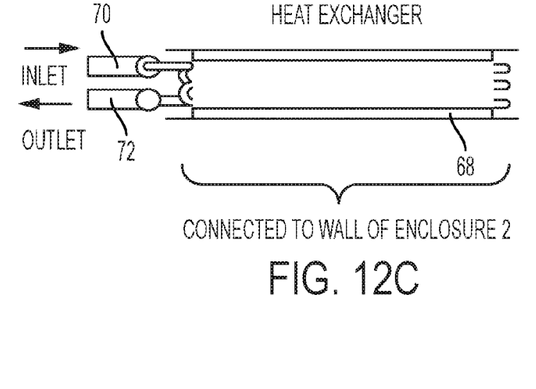

With reference to FIGS. 12A-12B, in another example further to the example shown in FIG. 10, the heat exchanger 68 shown in FIGS. 7A-7C can be positioned on the exterior surface of a wall 6 (or lid). In an example, heat exchanger 68 can be positioned between a heat spreader 96 and the exterior surface of a wall 6 (or lid) that includes cooling device 22 on the interior surface thereof, as shown in FIGS. 12A-12B. In another example, beat exchanger 68 can be positioned on an exterior surface of a first wall 6 (or lid), without a heat spreader 96 on the side of heat exchanger 68 opposite enclosure 2, and cooling device 22 can be positioned on the interior surface of a second, different wall 6 (or lid).

As can be seen, disclosed herein is a thermal transfer system that includes: an enclosure 2; a dielectric fluid 16 inside the enclosure; a porous medium 14 inside the enclosure, said porous medium at least partially immersed in said dielectric fluid; a cooling device 22 having a first surface contacting an interior surface of the enclosure and a second surface contacting the dielectric fluid, the porous medium, or both the dielectric fluid and the porous medium; a cutout or cavity 38 in the porous medium, said cutout or cavity configured to support an electrical or electronic device immersed in the dielectric fluid; a port 24 in a wall of the enclosure; and a set of electrical conductors 26 between the port and the electrical or electronic device immersed in the dielectric fluid.

The system can further include thermal insulation 18 between the porous medium 14 and the enclosure 2.

The set of electrical conductors 26 can include one or more conductors 26.

The port 24 can be configured to a receive a connector 25 that includes the set of electrical conductors 26.

The port 24 can be configured to form a fluid tight seal between the connector 25 and the enclosure 2 that avoids the dielectric fluid 16 from exiting the enclosure 2 between the connector 25 and the enclosure 2.

The port 24 can be configured to receive therethrough a cable 27 that includes the set of electrical conductors 26. The cable 27 can be round or flat.

The port 24 can be configured to form a fluid tight seal between the cable 27 and the enclosure 2 that avoids the dielectric fluid 16 from exiting the enclosure 2 between the cable 27 and the enclosure 2.

The enclosure can include an alignment feature, such as, for example, a recess 36, configured to mate with mating alignment feature 35 of the connector 25 or the cable 27.

The porous medium 14 can be a unitary piece or can be comprised of a plurality of porous sheets/layers 44.

The cutout or cavity can be defined by a subset of the plurality of porous sheets/layers.

The cooling device can be a thermoelectric cooler, a fluid radiator, a liquid chamber, or a vapor chamber.

The system can further include a heat spreader including one or more fins extending laterally from an exterior surface of the enclosure.

The system can include a fan positioned such that, when running, the fan moves air across the one or more fins.

The enclosure can be made from aluminum.

The thermal insulation can be silicone.

The dielectric medium can be oil.

The enclosure can be sealed such that the dielectric fluid remains inside the enclosure.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

The invention claimed is:

1. A thermal transfer system comprising:
    an enclosure comprising walls and a lid;
    a dielectric fluid inside the enclosure;
    a porous medium inside the enclosure, said porous medium at least partially immersed in said dielectric fluid;
    a cooling device having a first surface contacting an interior surface of the enclosure and a second surface contacting the dielectric fluid, the porous medium, or both the dielectric fluid and the porous medium;
    a cutout or cavity in the porous medium, said cutout or cavity configured to support an electrical or electronic device immersed in the dielectric fluid with the electrical or electronic device surrounded by the porous medium and spaced from the walls and the lid of the enclosure;
    a port in a wall of the enclosure; and
    a set of electrical conductors between the port and the electrical or electronic device immersed in the dielectric fluid.

2. The system of claim 1, further including thermal insulation between the porous medium and the enclosure.

3. The system of claim 1, wherein the set of electrical conductors includes one or more conductors.

4. The system of claim 1, wherein the port is configured to receive a connector that includes the set of electrical conductors.

5. The system of claim 4, wherein the port is configured to form a fluid tight seal between the connector and the enclosure that avoids the dielectric fluid from exiting the enclosure between the connector and the enclosure.

6. The system of claim 5, wherein the enclosure includes an alignment feature configured to mate with mating alignment feature of the connector.

7. The system of claim 1, wherein the port is configured to receive therethrough a cable that includes the set of electrical conductors, wherein the cable is round or flat.

8. The system of claim 7, wherein the port is configured to form a fluid tight seal between the cable and the enclosure that avoids the dielectric fluid from exiting the enclosure between the cable and the enclosure.

9. The system of claim 8, wherein the enclosure includes an alignment feature configured to mate with mating alignment feature of the cable.

10. The system of claim 1, wherein the porous medium is comprised of a plurality of porous sheets/layers.

11. The system of claim 9, wherein the cutout or cavity is defined by a subset of the plurality of porous sheets/layers.

12. The system of claim 1, wherein the cooling device is a thermoelectric cooler.

13. The system of claim 1, wherein the cooling device is a fluid radiator.

14. The system of claim 1, wherein the cooling device is a liquid chamber or a vapor chamber.

15. The system of claim 1, further including a heat spreader including one or more fins extending laterally from an exterior surface of the enclosure.

16. The system of claim 14, further including a fan positioned such that, when running, the fan moves air across the one or more fins.

17. The system of claim 1, wherein the enclosure is made from aluminum.

18. The system of claim 2, wherein the thermal insulation is silicone.

19. The system of claim 1, wherein the dielectric medium is oil.

20. The system of claim 1, wherein the enclosure is sealed such that the dielectric fluid remains inside the enclosure.

* * * * *